(12) United States Patent
Hassan et al.

(10) Patent No.: US 10,288,724 B2
(45) Date of Patent: *May 14, 2019

(54) SYSTEM AND METHOD FOR ESTIMATING DISTANCE BETWEEN A MOBILE UNIT AND A VEHICLE USING A TOF SYSTEM

(71) Applicant: MAGNA ELECTRONICS INC., Auburn Hills, MI (US)

(72) Inventors: Hasib Hassan, Belleville, MI (US); Dale R. Benton, Davison, MI (US); John Lu, Grand Blanc, MI (US); Brian A. Gorman, Burton, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 672 days.

This patent is subject to a terminal disclaimer.

(21) Appl. No.: 14/946,856

(22) Filed: Nov. 20, 2015

(65) Prior Publication Data

US 2016/0077200 A1    Mar. 17, 2016

Related U.S. Application Data

(63) Continuation of application No. 13/443,998, filed on Apr. 11, 2012, now Pat. No. 9,194,943.

(Continued)

(51) Int. Cl.
*G01S 11/02* (2010.01)
*G01S 11/06* (2006.01)
*G01S 11/08* (2006.01)

(52) U.S. Cl.
CPC ............. *G01S 11/02* (2013.01); *G01S 11/06* (2013.01); *G01S 11/08* (2013.01)

(58) Field of Classification Search
CPC ........... G01S 11/02; G01S 11/06; G01S 11/08

(Continued)

(56) References Cited

U.S. PATENT DOCUMENTS 5,182,502 A    1/1993   Slotkowski et al.
5,184,956 A    2/1993   Langlais et al.
(Continued)

FOREIGN PATENT DOCUMENTS

WO    WO2008127752    10/2008
WO    WO2008154747    12/2008
(Continued)

OTHER PUBLICATIONS

Vermeiren, Detectiong Human Motion: Introducing Step, Fall and ADL Algorithms, 2010, Institute for Computer Sciences, Social-Informatics and Telecommunications Engineering.

(Continued)

*Primary Examiner* — Cassi J Galt
(74) *Attorney, Agent, or Firm* — Honigman LLP

(57) ABSTRACT

A method of estimating a distance between a mobile unit and a vehicle includes providing a time of flight subsystem including circuitry incorporated in the mobile unit and circuitry incorporated in the vehicle, and generating a time of flight distance signal by periodically transmitting a time of flight signal between the mobile unit and the vehicle and measuring the time taken for transmission of the time of flight signal therebetween. A travel sensor is disposed at the mobile unit and generates a travel sensor signal. A value of a distance estimate signal is initialized based on the time of flight distance signal. A movement of the mobile unit is determined based on variance in the travel sensor signal. The initialized value of the initialized distance estimate signal is changed or increased or decreased based upon determination of movement of the mobile unit.

20 Claims, 7 Drawing Sheets

Related U.S. Application Data

(60) Provisional application No. 61/474,471, filed on Apr. 12, 2011.

(58) Field of Classification Search
USPC .............................. 340/539.1, 992; 342/458
See application file for complete search history.

(56) References Cited

U.S. PATENT DOCUMENTS

| | | |
|---|---|---|
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,567,360 A | 10/1996 | Varaprasad et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,715,093 A | 2/1998 | Schierbeek et al. |
| 5,724,316 A | 3/1998 | Brunts |
| 5,737,226 A | 4/1998 | Olson et al. |
| 5,760,826 A | 6/1998 | Nayer |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,823,654 A | 10/1998 | Pastrick et al. |
| 5,831,937 A | 11/1998 | Weir et al. |
| 5,835,255 A | 11/1998 | Miles |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,910,854 A | 6/1999 | Varaprasad et al. |
| 5,914,815 A | 6/1999 | Bos |
| 5,923,027 A | 7/1999 | Stam et al. |
| 5,924,212 A | 7/1999 | Domanski |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,139,172 A | 10/2000 | Bos et al. |
| 6,144,022 A | 11/2000 | Tenenbaum et al. |
| 6,154,306 A | 11/2000 | Varaprasad et al. |
| 6,172,613 B1 | 1/2001 | DeLine et al. |
| 6,175,164 B1 | 1/2001 | O'Farrell et al. |

(56) References Cited

U.S. PATENT DOCUMENTS

| | | |
|---|---|---|
| 6,175,300 B1 | 1/2001 | Kendrick |
| 6,178,034 B1 | 1/2001 | Allemand et al. |
| 6,198,409 B1 | 3/2001 | Schofield et al. |
| 6,201,642 B1 | 3/2001 | Bos |
| 6,222,447 B1 | 4/2001 | Schofield et al. |
| 6,227,689 B1 | 5/2001 | Miller |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,323,942 B1 | 11/2001 | Bamji |
| 6,326,613 B1 | 12/2001 | Heslin et al. |
| 6,333,759 B1 | 12/2001 | Mazzilli |
| 6,341,523 B2 | 1/2002 | Lynam |
| 6,353,392 B1 | 3/2002 | Schofield et al. |
| 6,370,329 B1 | 4/2002 | Teuchert |
| 6,392,315 B1 | 5/2002 | Jones et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek et al. |
| 6,516,664 B2 | 2/2003 | Lynam |
| 6,523,964 B2 | 2/2003 | Schofield et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,580,496 B2 | 6/2003 | Bamji et al. |
| 6,589,625 B1 | 7/2003 | Kothari et al. |
| 6,590,719 B2 | 7/2003 | Bos |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,636,258 B2 | 10/2003 | Strumolo |
| 6,648,477 B2 | 11/2003 | Hutzel et al. |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,819,231 B2 | 11/2004 | Berberich et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,882,287 B2 | 4/2005 | Schofield |
| 6,889,161 B2 | 5/2005 | Winner et al. |
| 6,891,563 B2 | 5/2005 | Schofield et al. |
| 6,902,284 B2 | 6/2005 | Hutzel et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,593 B2 | 2/2006 | Weller et al. |
| 7,004,606 B2 | 2/2006 | Schofield |
| 7,005,974 B2 | 2/2006 | McMahon et al. |
| 7,012,727 B2 | 3/2006 | Hutzel et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |
| 7,195,381 B2 | 3/2007 | Lynam et al. |
| 7,202,776 B2 | 4/2007 | Breed |
| 7,205,904 B2 | 4/2007 | Schofield |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B2 | 3/2008 | Schofield et al. |
| 7,344,261 B2 | 3/2008 | Schofield et al. |
| 7,355,524 B2 | 4/2008 | Schofield |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,425,076 B2 | 9/2008 | Schofield et al. |
| 7,446,650 B2 | 11/2008 | Schofield et al. |
| 7,459,664 B2 | 12/2008 | Schofield et al. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,526,103 B2 | 4/2009 | Schofield et al. |
| 7,561,181 B2 | 7/2009 | Schofield et al. |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,647,196 B2 | 1/2010 | Kahn et al. |
| 7,650,864 B2 | 1/2010 | Hassan et al. |
| 7,720,580 B2 | 5/2010 | Higgins-Luthman |
| 7,855,755 B2 | 12/2010 | Weller et al. |
| 7,881,496 B2 | 2/2011 | Camilleri et al. |
| 7,914,187 B2 | 3/2011 | Higgins-Luthman et al. |
| 7,965,336 B2 | 6/2011 | Bingle et al. |
| 8,027,029 B2 | 9/2011 | Lu et al. |
| 8,058,977 B2 | 11/2011 | Lynam |
| 8,217,830 B2 | 7/2012 | Lynam |
| 9,194,943 B2 | 11/2015 | Hassan et al. |
| 2002/0015153 A1 | 2/2002 | Downs |
| 2002/0044065 A1 | 4/2002 | Quist et al. |
| 2002/0113873 A1 | 8/2002 | Williams |
| 2002/0159270 A1 | 10/2002 | Lynam et al. |

(56) References Cited

U.S. PATENT DOCUMENTS

| | | |
|---|---|---|
| 2003/0137586 A1 | 7/2003 | Lewellen |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0114381 A1 | 6/2004 | Salmeen et al. |
| 2004/0128065 A1 | 7/2004 | Taylor et al. |
| 2004/0200948 A1 | 10/2004 | Bos et al. |
| 2005/0078389 A1 | 4/2005 | Kulas et al. |
| 2005/0134966 A1 | 6/2005 | Burgner |
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0232469 A1 | 10/2005 | Schofield et al. |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0061008 A1 | 3/2006 | Karner et al. |
| 2006/0091813 A1 | 5/2006 | Stam et al. |
| 2006/0103727 A1 | 5/2006 | Tseng |
| 2006/0164230 A1 | 7/2006 | DeWind et al. |
| 2006/0250501 A1 | 11/2006 | Wildmann et al. |
| 2007/0023613 A1 | 2/2007 | Schofield et al. |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0176080 A1 | 8/2007 | Schofield et al. |
| 2008/0180529 A1 | 7/2008 | Taylor et al. |
| 2009/0113509 A1 | 4/2009 | Tseng et al. |
| 2009/0243824 A1 | 10/2009 | Peterson et al. |
| 2009/0244361 A1 | 10/2009 | Gebauer et al. |
| 2009/0295181 A1 | 12/2009 | Lawlor et al. |
| 2010/0020170 A1 | 1/2010 | Higgins-Luthman et al. |
| 2010/0045797 A1 | 2/2010 | Schofield et al. |
| 2010/0097469 A1 | 4/2010 | Blank et al. |
| 2010/0171642 A1 | 7/2010 | Hassan et al. |
| 2012/0019940 A1 | 1/2012 | Lu et al. |
| 2012/0062743 A1 | 3/2012 | Lynam et al. |
| 2012/0162427 A1 | 6/2012 | Lynam |

FOREIGN PATENT DOCUMENTS

| | | |
|---|---|---|
| WO | WO2009073054 | 6/2009 |
| WO | WO2010099416 | 9/2010 |
| WO | WO2011014497 | 2/2011 |

OTHER PUBLICATIONS

Willemsen, Automatic Stance-Swing Phase Detection from Accelerometer Data for Peroneal Nereve Simulation, 1990, IEEE.

SYSTEM AND METHOD FOR ESTIMATING DISTANCE BETWEEN A MOBILE UNIT AND A VEHICLE USING A TOF SYSTEM

CROSS REFERENCE TO RELATED APPLICATIONS

The present application is a continuation of U.S. patent application Ser. No. 13/443,998, filed Apr. 11, 2012, now U.S. Pat. No. 9,194,943, which claims the filing benefit of U.S. provisional application Ser. No. 61/474,471, filed Apr. 12, 2011, which is hereby incorporated herein by reference in its entirety.

FIELD OF THE INVENTION

The invention relates to the field of filters, and more particularly to a step filter for estimating a range or distance between two components that utilize a time-of-flight (TOF) ranging system.

BACKGROUND OF THE INVENTION

U.S. Publication No. 2010/0171642, owned by the assignee of the present application, proposes a remote vehicle control system for a vehicle. The system includes a mobile control node, such as a key fob having some display capability, that interacts via a bi-directional radio link with a base unit in the vehicle. The base unit is connected to the vehicle control system and allows the mobile control node to function as an input and output node on a vehicle control network, allowing remote control of the vehicle and providing functions such as remote or passive keyless entry. The remote control system also provides a vehicle location function wherein the range or distance and the bearing between the mobile control node and the vehicle can be determined and displayed on the mobile control node. The distance estimate and bearing are calculated by determining the range between the mobile control node and vehicle using a time of flight (TOF) methodology (in which distance is estimated by measuring the time taken for a signal to circumnavigate two components), and by processing the travel distance of the mobile control node and compass data in order to triangulate the position of the vehicle relative to the mobile control node.

One of the technical issues that arises in the aforementioned remote vehicle control system is the accuracy of the distance estimate in noisy environments where there are many reflection sources in the region between the vehicle and the mobile control node. In such an environment the TOF signal may follow multiple paths resulting in potentially inaccurate distance estimations from the TOF subsystem, with consequences to the performance of the remote vehicle system. It is desired to improve the accuracy of the distance estimation.

SUMMARY OF THE INVENTION

According to an aspect of the invention a system and related method are provided for estimating a distance between a mobile node and a base station. The system includes a time of flight subsystem including circuitry incorporated in the mobile node and the base station. The TOF subsystem generates a TOF distance signal by periodically transmitting a TOF signal between the mobile node and the base station and measuring the time taken for transmission of the TOF signal therebetween, which leads to a distance reading. The mobile node includes an accelerometer for generating an accelerometer signal. The system includes a filter which: initializes the value of a distance estimate signal based on the TOF distance signal; detects a human step based on variances in the accelerometer signal; and changes the value of the distance estimate signal by a predetermined quantum only upon detection of a human step, the distance estimate signal being increased or decreased depending on a direction of the TOF distance signal relative to the distance estimate signal.

Optionally, a raw TOF distance signal generated by the time of flight subsystem may be passed through a smoothing filter such as a digital biased median filter to thereby generate a smoothed TOF distance signal utilized in changing the value of the distance estimate. Likewise, a raw accelerometer signal generated by the accelerometer is preferably passed through a smoothing filter such as a digital median filter to thereby generate a smoothed accelerometer signal utilized in detecting a human step.

The direction of the smoothed TOF distance signal may be determined based on the value of smoothed TOF distance signal at the substantially the same instant in time when a human step is detected. Alternatively, the direction of the smoothed TOF distance signal may be determined based on an average of the smoothed TOF distance signal for a period of time before a human step is detected.

Optionally, the quantum for increasing the value of the distance estimate may be lower than the quantum for decreasing the value of the distance estimate signal. These quantums are generally approximately the expected maximum stride length.

The process of detecting a human step preferably includes examining the smoothed accelerometer signal for the occurrence of two serial local peaks, each of which exceeds a predetermined amplitude, within a predetermined range of time periods indicative of human gait. In addition, the process of detecting a human step preferably further includes examining the smoothed accelerometer signal for a slope within a predetermined range of slopes indicative of human gait.

Another method for estimating a distance between a mobile node and a base station is disclosed. This method includes providing or provisioning a time of flight subsystem including circuitry incorporated in the mobile node and the base station and generating a TOF distance signal by periodically transmitting a TOF signal between the mobile control node and the base station and measuring the time taken for transmission of the TOF signal therebetween; providing or provisioning a radio signal strength subsystem including circuitry incorporated in the mobile node and the base station and generating an SSI distance signal based on a strength of a radio signal received by one of the mobile node and the base station; provisioning an accelerometer on the mobile node and generating an accelerometer signal therewith; fusing the SSI distance signal and the TOF distance signal to generate a fused distance signal; initializing the value of a distance estimate signal based on the fused distance signal; detecting a human step based on variances in the accelerometer signal; and changing the value of the distance estimate signal by a predetermined quantum only upon detection of a human step, the change being an increase or decrease depending on a direction of the fused distance signal relative to the distance estimate signal.

These and other objects, advantages, purposes and features of the present invention will become apparent upon review of the following specification in conjunction with the drawings.

DETAILED DESCRIPTION OF PREFERRED EMBODIMENTS

This application incorporates by reference in its entirety U.S. Publication No. 2010/0171642, published Jul. 8, 2010, and entitled "Mobile Control Node System and Method for Vehicles".

Figure 1:
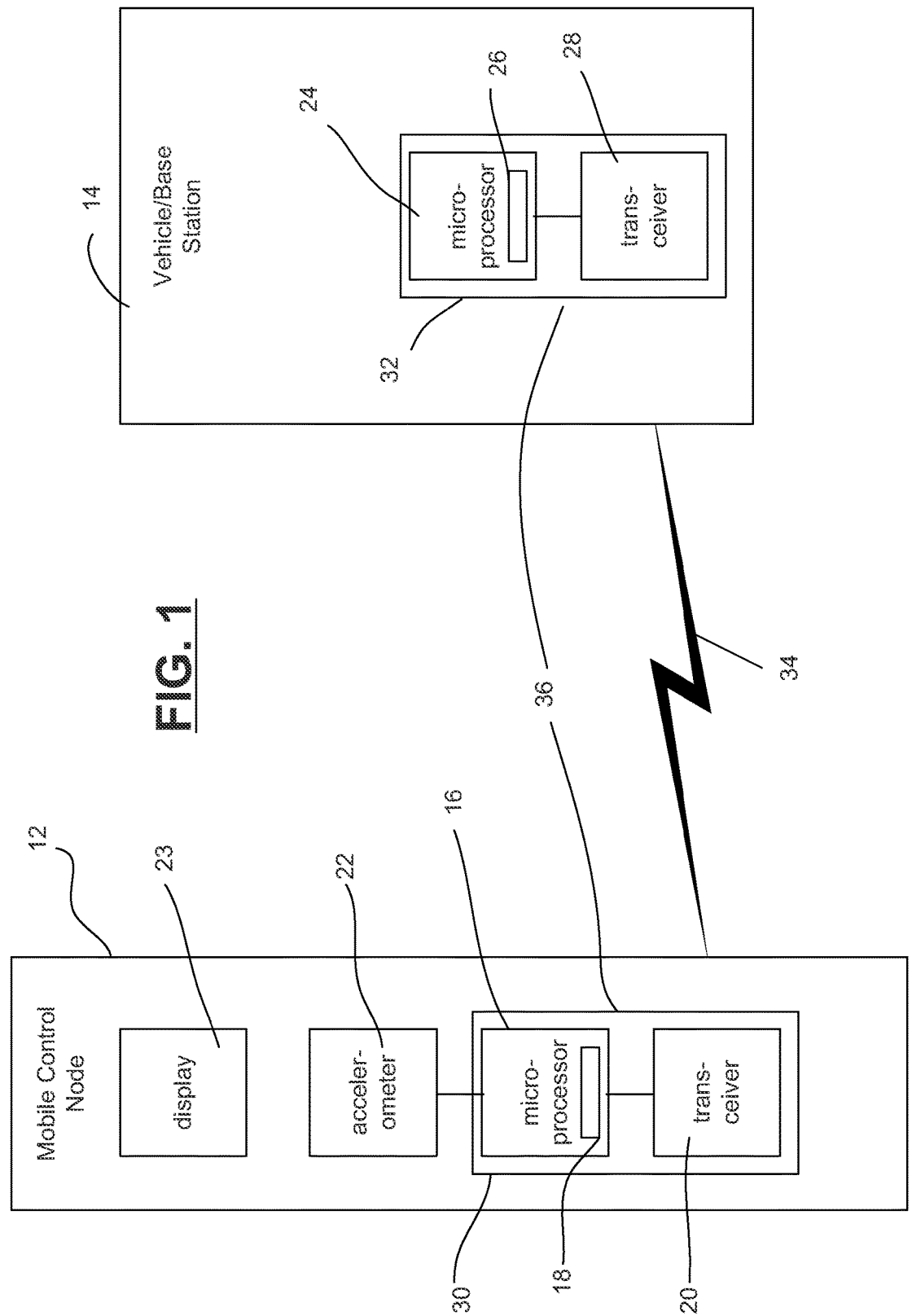
FIG. 1 is a schematic hardware block diagram of a system for estimating the range or distance between two components capable of communicating wirelessly with one another.

As is generally discussed in the above noted publication, and referring additionally to FIG. 1 herein, it is desired to estimate the distance between a mobile control node 12 and a base station 14, which may be installed in a vehicle. The mobile control node 12 includes a microprocessor 16 including program store and data memory 18. A transceiver 20 is connected to the microprocessor. An accelerometer 22 is also connected to the microprocessor. A display 23 is provided for user interface purposes.

The base station 14 is likewise configured to include a microprocessor 24 with program store and data memory 26. A transceiver 28 is connected to microprocessor 24.

The microprocessor and transceiver combination may be provided as a single integrated circuit 30 in mobile control node 12 and single integrated circuit 32 in base station 14. The circuits 30, 32 are configured to communicate with one another over a wireless link 34 as discussed in U.S. Publication No. 2010/0171642 and together provide a time-of-flight (TOF) ranging subsystem 36 that generates a reading of the range or distance between the mobile control node 12 and base station 14.

The mobile control node 12 includes a distance filter 100, as may be provided by suitable programming of microprocessor 16, which strives to generate stable and accurate estimates of the range or distance between the mobile control node 12 and base station 14 for view on display 23.

Figure 2:
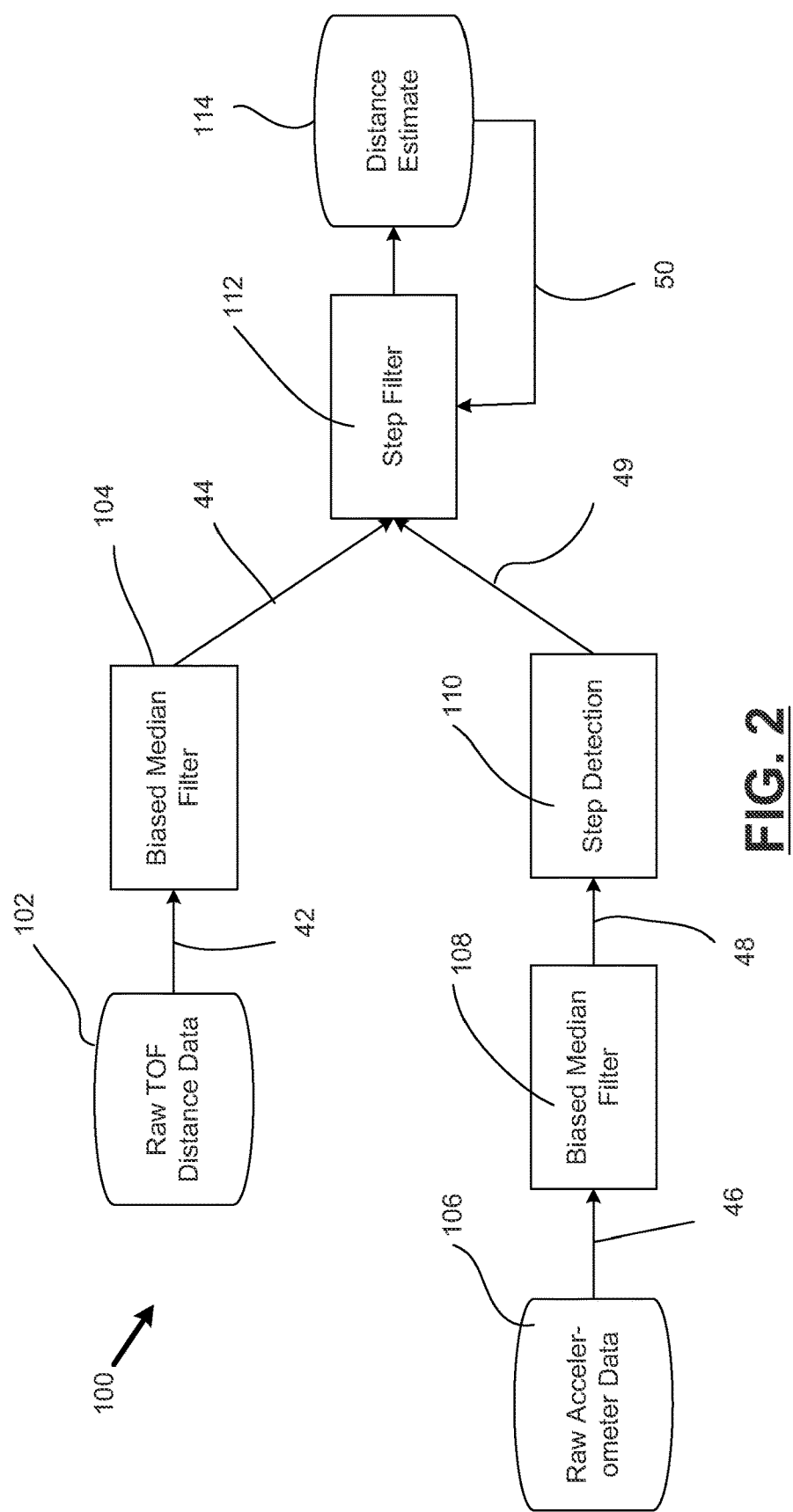
FIG. 2 is a software-oriented system block diagram of a filter according to one embodiment of the invention utilized by the distance estimating system of FIG. 1.

FIG. 2 shows a system block diagram for a preferred distance filter 100. In a first functional block 102 the raw distance data from the TOF subsystem 36 is received and output as a digital signal 42. An example of the raw TOF distance signal is shown as signal 42' in FIG. 3.

The raw TOF distance signal 42 is passed through a smoothing filter such as a biased median filter 104, as discussed in greater detail below, which provides a smoothed TOF distance signal 44. An example of the smoothed TOF distance signal is shown as signal 44' in FIG. 3.

In parallel, the distance filter 100 receives raw accelerometer data at functional block 106 which outputs a digital signal 46. An example of the raw accelerometer signal is shown as signal 46' in FIG. 3.

The raw accelerometer signal 46 is passed through a smoothing filter such as a biased median filter 108, as discussed in greater detail below, which provides a smoothed accelerometer signal 48. An example of the smoothed accelerometer signal is shown as signal 48' in FIG. 3.

The smoothed accelerometer signal 48 is fed into a step detection block 110 that detects if and when a human step has occurred, as discussed in greater detail below. Bock 110 generates a signal 49 that is acted on by functional block 112.

Functional block 112 is a step filter which couples or applies the output of the step detection block 110 to the smoothed TOF distance signal 44 provided by block 104 in order to constrain the distance estimated by filter 100. Generally speaking, the step filter block 112 utilizes the detection of a person's step as a quantum to limit the increase or decrease in the distance estimate and utilizes the smoothed TOF signal 44 to determine the direction of the distance estimate, or in other words, to determine whether or not to increase or decrease the estimated distance.

Each of the functional blocks will now be discussed in greater detail.

The smoothing filters of functional blocks 104 and 108 are preferably digital biased median filters. A median filter selects a median value in a set of n input values. The set selection window can be a serial window (e.g., selecting input values 1 . . . n, n+1 . . . 2n, 2n+1 . . . 3n, etc.,) or a sliding window (e.g., selecting input values 1 . . . n, 2 . . . n+1, 3 . . . n+2, etc.), preferably a sliding window. A biased median filter will, after ordering the values in the set, discard a predetermined number of higher or lower placed values to thus bias the filter to either high or low values. In the preferred embodiment, the biased median filter is characterized by three variables or parameters: Sample Size, Number of High Values to Discard, and Number of Low Values to Discard. The output of the biased median filter is the median of the remaining values in the set, or alternatively the arithmetic average of the remaining values in the set.

In the biased median filter 104, the data being smoothed is the raw TOF distance signal 42. This data tends to error on the high side due to the existence of reflections and multipath propagation of the TOF signal. Accordingly, the biased median filter 104 is preferably biased to the low side. For example, to generate the smoothed TOF distance signal 44 shown in FIG. 3, the Sample Size for filter 104 was set to ten (in circumstances where the input raw TOF signal 42 is collected at forty samples per second), the Number of High Values to Discard was set to four, and the Number of Low Values to Discard was set to two. The remaining four values in the set were averaged to generate the output of the filter 104.

In the biased median filter 108, the data being smoothed is the raw accelerometer signal 46. The noise in this data tends to be random and thus not biased towards high or low values. However, it is important that the sample size is selected to be smaller than the number of samples that may be obtained during a single step. Thus, for example, to generate the smoothed accelerometer signal 48 shown in FIG. 3, the Sample Size for filter 108 was set to ten in circumstances where the input raw accelerometer signal 46 is collected at forty samples per second, the Number of High Values to Discard was set to zero, and the Number of Low Values to Discard was set to zero.

The step detection block 110 examines the smoothed accelerometer signal 48 to determine if two local peaks occur in the signal within a certain period of time, thus signifying the occurrence of a human step. For example, referring to FIG. 4, the step detection block 110 signals the occurrence of a human step when two local peaks 124, 130 occur in a period of time T, where t1<T<t2. This block is characterized by three variables or configurable parameters: Minimum Step Amplitude, Minimum Step Period (t1), and Maximum Step Period (t2).

The Minimum Step Amplitude is device dependent. For example, the accelerometer that was used to generate the data illustrated in FIG. 3 had a steady state value ranging between about zero and fifty due to system noise. The peak values that were experienced when a step was taken by a wide variety of people ranged between about one hundred to about three hundred. Hence, a value between fifty and one hundred, e.g., eighty, can be selected for the Minimum Step Amplitude.

The Minimum Step Period and Maximum Step Period are selected to encompass the maximum and minimum anticipated pace of human steps, respectively. To generate the data in FIG. 3, the Minimum Step Period was set to 0.3 m and the Maximum Step Period was set to 1.2 m.

Figure 4:
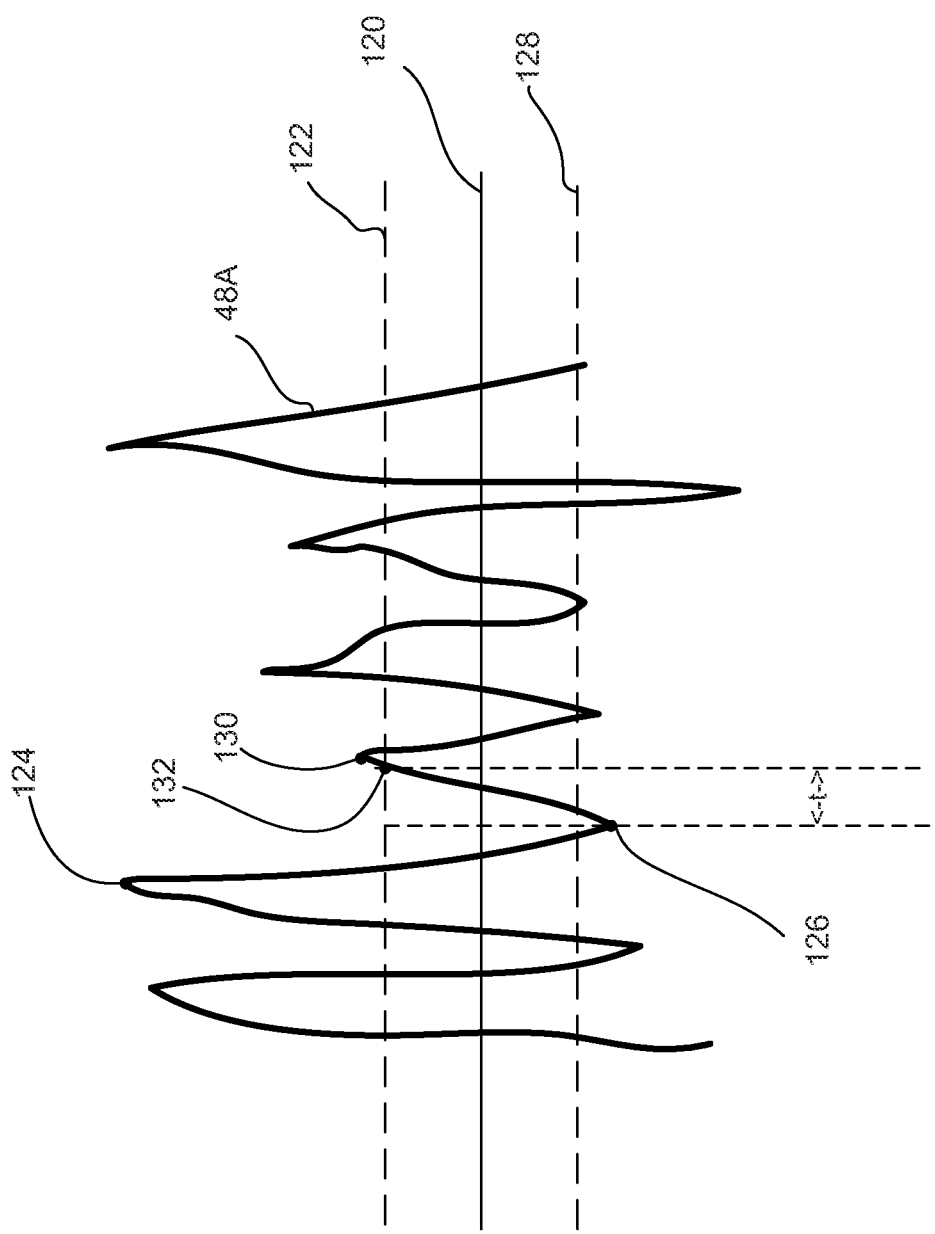
FIG. 4 is detailed view of an accelerometer signal shown in FIG. 3, highlighting certain characteristics of the signal which are utilized by the filter to detect the occurrence of a human step.

In practice, the step detection block 110 references a base level 120 (such as zero) in the smoothed accelerometer signal 48, which is exemplified in FIG. 4 by signal portion 48A. When the level of the smoothed accelerometer signal 48A exceeds the base level by the Minimum Step Amplitude as represented by stippled line 122, the block 110 notes a maximum local level, e.g. at point 124. Then, a local minimum level is identified at point 126. In order to qualify as a human step, the local minimum level must also be below a threshold value represented by stippled line 128. In addition, the time stamp or occurrence of the local minimum level 126 is compared against the time stamp or occurrence of the local maximum level 124 to ensure that the time difference falls within a predetermined range that represents a permissible acceleration slope, otherwise no step is determined. The permissible range of acceleration slopes identifies an important behavior of pedal locomotion or human gait, being a relatively rapid deceleration profile within expected limits. Then, the functional block 110 looks for the next local maximum level, e.g. at point 130. If, commencing from local minimum level 126, the level of the smoothed accelerometer signal 48A exceeds the Minimum Step Amplitude during a period of time t between one half the Minimum Step Period and one half the Maximum Step Period, the block 110 determines that a single human step has been taken. Thus for example, the block 110 concludes that a human step has occurred at point 132 in FIG. 4. The process repeats continuously.

Figure 3:
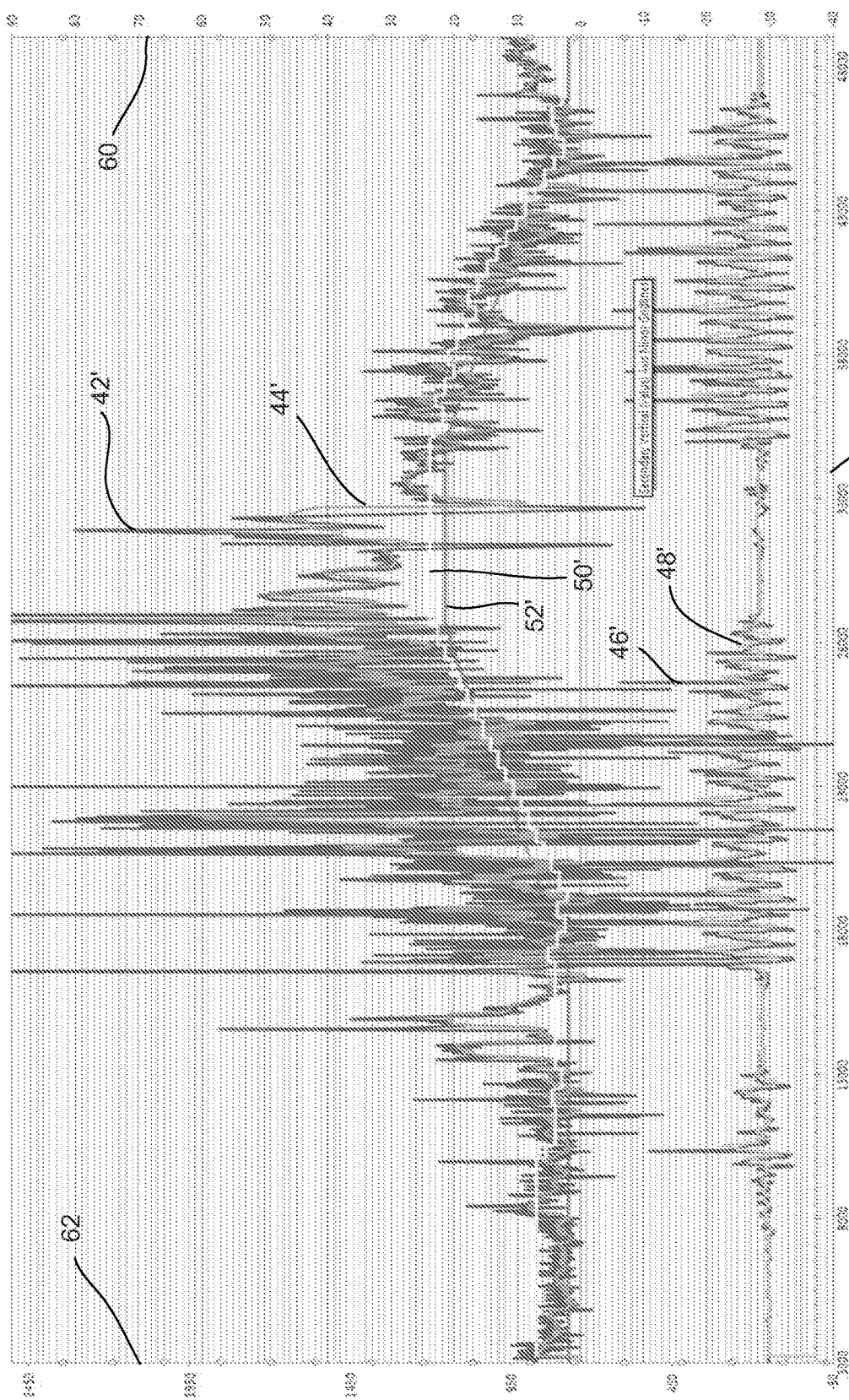
FIG. 3 is a graph exemplifying various input, intermediate and output signals processed by the distance filter shown in FIG. 2.

As previously mentioned, the step filter block 112 utilizes the output of the step detection block 110 in order to constrain the smoothed TOF distance data 44 in order to arrive at a distance estimate. FIG. 3 shows the distance estimate 50' generated by the step filter block 112 in comparison to an actual measured distance 52' and in relation to the smoothed raw TOF distance data 44' and the raw TOF distance data 42'. These distance data are graphed in relation to the right vertical axis 60, which represents a distance in meters between the mobile control node and the base transceiver. FIG. 3 also plots the raw accelerometer data 46' and smoothed accelerometer data 48' in relation to the left vertical axis 62, which represents the output of the accelerometer. The horizontal axis 64 represents the sample number that is common to both TOF and accelerometer data.

As can be seen in FIG. 3, whenever the step detection block 110 signals the occurrence of a step, the step filter block 112 will vary the distance estimate 50' by a predestined quantum of either a Maximum Positive Distance Change per Step, applicable when distance between the base transceiver and the mobile control node increases, or a Maximum Negative Distance Change Per Step, applicable when distance between the base transceiver and the mobile control node decreases. Since reflections and multipath propagation will likely cause a positive error in the TOF distance data, it is beneficial to limit the Maximum Positive Distance Change Per Step more than the Maximum Negative Distance Change Per Step. Both quantities should be close to the maximum expected stride length expected, for example 1.2 m and 1.5 m, respectively.

Figure 5:
FIG. 5 is detailed view of various signals shown in FIG. 3, highlighting certain relationships between the signals which are utilized by the filter to detect the direction of motion.

In order to determine the direction, i.e., whether to increase or decrease the value of distance estimate signal 50, the step filter block 112 of the preferred embodiment compares the current distance estimate against the smoothed TOF distance signal 44. If, at the instance a step is detected, the smoothed TOF distance signal 44 is greater than the current distance estimate signal 50 then its current value is incremented by the Maximum Positive Distance Change Per Step, otherwise the current value of the distance estimate signal 50 is decremented by the Maximum Negative Distance Change Per Step. This can be seen best in FIG. 5, which shows a portion 44A of the smoothed TOF distance signal 44', a portion 50A of the distance estimate signal 50', and a portion 52A of the measured distance signal 52'. As seen in FIG. 5, a human step is detected at time instants $t_a$, $t_b$, and $t_c$. At $t_a$, the smoothed TOF measured distance signal 52' is less than the distance estimate signal 50', so the distance estimate signal 50' is reduced at that time. At each of times $t_b$ and $t_c$, the smoothed TOF measured distance signal 52' is greater than the distance estimate signal 50', so the distance estimate signal 50' is increased at those instances.

It will be appreciated that in the event noise is not random, the performance of the preferred embodiment could suffer due to the fact that the direction of the distance estimate is determined substantially at the instance each human step is detected by block 110. In order to counteract such phenomenon, the smoothed TOF distance data samples may be averaged for a discrete time period in order to use this quantity as the comparison, with the distance estimate being incremented in the event the average is greater than the distance estimate or decremented in the event the average is less than the distance estimate.

The initial value of the distance estimate signal 50 may be based on an initial value of the raw TOF distance data, as shown in FIG. 3. In the alternative, some conditions may be placed prior to registering the initial value, such as requiring no substantive changes to the accelerometer data and TOF data for a certain period of time in order to obtain an estimate under relatively steady state conditions.

Figure 6:
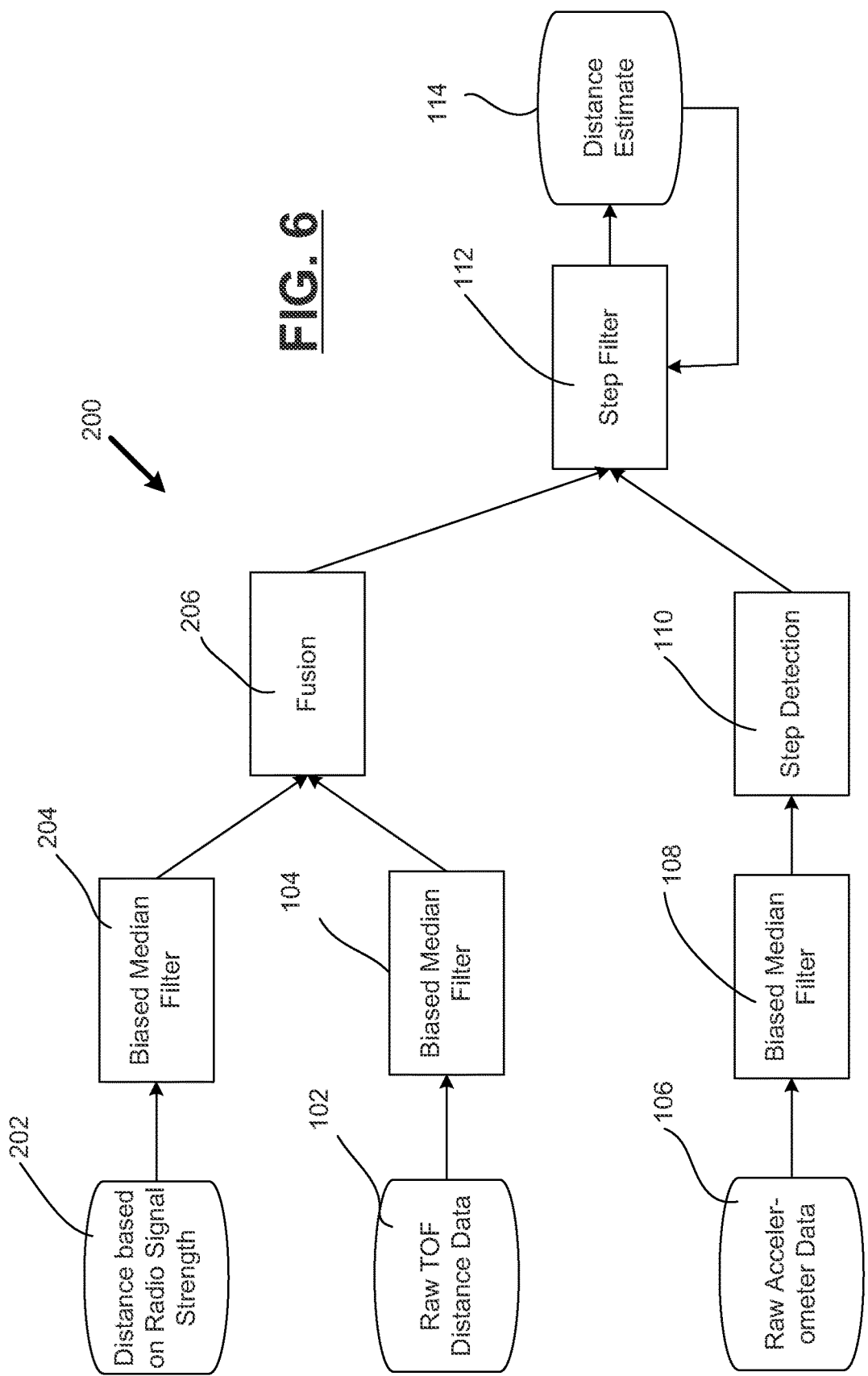
FIG. 6 is a software-oriented system block diagram of a filter according to another embodiment of the invention.
Figure 7:
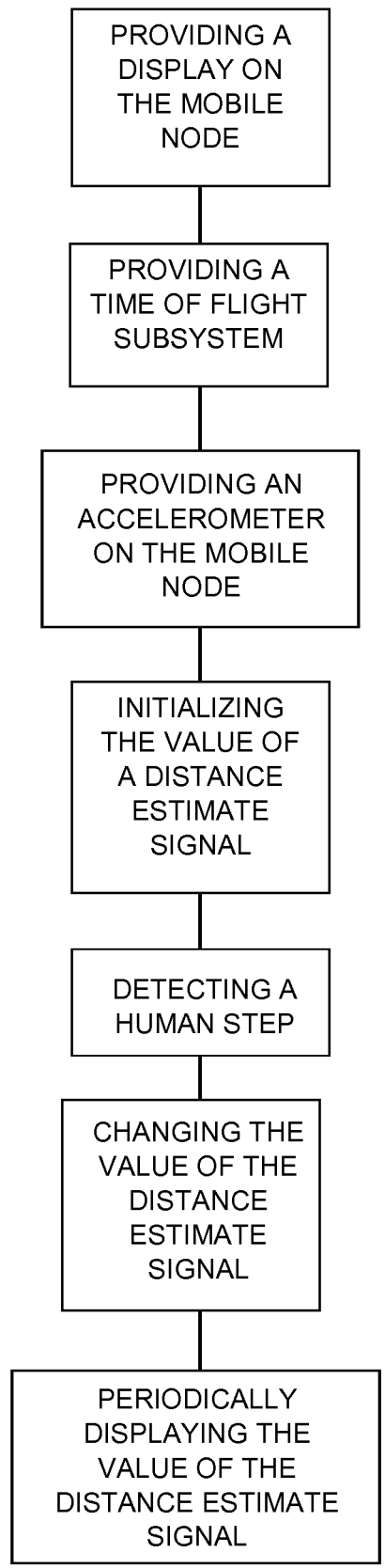
FIG. 7 is a flow chart showing a method in accordance with the present invention

FIG. 6 shows another embodiment of a distance filter 200. In this embodiment, the distance filter also utilizes radio signal strength as measured by the base station as another indicator in estimating the distance between the mobile control node and the base station. The raw radio signal strength is provided to functional block 202 which computes a raw SSI distance signal based on the strength of the battery in the mobile control node and the radio signal strength received at the base station, which are correlated to distance. Alternatively, the raw SSI distance signal can be based on the radio signal strength received at the mobile control node, it being presumed that the battery level of the base station, which may the relatively large 12V accessory battery of the vehicle, remains constant. This raw distance signal is fed to another biased median filter 204 similar to those described above to generate a smoothed SSI distance signal, based on signal strength. Functional block 206 fuses the smoothed SSI distance signal and the smoothed TOF distance signal derived from the TOF subsystem. The fusion block 206 may be as simple as a weighted average of the two signals, or a more sophisticated algorithm, such as a Kalman filter or the like. In either event, a smoother distance estimate is expected in comparison to the TOF data taken in isolation. The output of the fusion block 206 is fed to the step filter 112 along with the output of the step detection block 110.

The circuitry for the distance filter 100 or 200, which can be provided by a suitably programmed microprocessor or digital signal processor (DSP), may be incorporated in the base station or the mobile control node, or may be implemented by circuitry located on both components. The specific physical location is not important since the base station and the mobile control node are able to communicate with one another and pass appropriate messages therebetween.

The display and/or the system of the present invention may be associated with a camera or imaging sensor of the vehicle that is operable to capture images, such as video images of a scene occurring within the camera's field of view. The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. provisional application Ser. No. 61/565,713, filed Dec. 1, 2011; and/or Ser. No. 61/563,965, filed Nov. 28, 2011, which are hereby incorporated herein by reference in their entireties.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, such as in the manner described in U.S. Pat. Nos. 5,550,677; 5,877,897; 6,498,620; 5,670,935; 5,796,094 and/or 6,396,397, and/or U.S. provisional applications, Ser. No. 61/614,880, filed Mar. 23, 2012; Ser. No. 61/615,410, filed Mar. 26, 2012; Ser. No. 61/613,651, filed 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/559,970, filed Nov. 15, 2011; Ser. No. 61/552,167, filed Oct. 27, 2011; Ser. No. 61/540,256, filed Sep. 28, 2011; Ser. No. 61/513,745, filed Aug. 1, 2011; Ser. No. 61/511,738, filed Jul. 26, 2011; and/or Ser. No. 61/503,098, filed Jun. 30, 2011, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011 and published Mar. 15, 2012 as U.S. Publication No. US 2012-0062743, and/or U.S. provisional applications, Ser. No. 61/567,150, filed Dec. 6, 2011; Ser. No. 61/565,713, filed Dec. 1, 2011; and/or Ser. No. 61/537,279, filed Sep. 21, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508, 840, filed Jul. 24, 2009, and published Jan. 28, 2010 as U.S. Pat. Publication No. US 2010-0020170; and/or U.S. provisional applications, Ser. No. 61/511,738, filed Jul. 26, 2011; and/or Ser. No. 61/503,098, filed Jun. 30, 2011, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US 2009-0244361; and/or Ser. No. 13/260,400, filed Sep. 26, 2011, now U.S. Pat. No. 8,542,451, and/or U.S. Pat. Nos. 7,965, 336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580; 7,965,336 and/or 8,070,332, and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526, 103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,720,580; 7,859,565 and/or 8,070,332, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018-A1, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US 2010-0097469, which are hereby incorporated herein by reference in their entireties.

Optionally, the display of the system may be operable to display images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011 and published Jun. 28, 2012 as U.S. Publication No. US 2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Sep. 30, 2010 as International Publication No. WO 2010/111465, which is hereby incorporated herein by reference in its entirety). Optionally, the system (utilizing a forward and/or rearward facing camera and other cameras disposed at the vehicle with exterior fields of view) and/or the camera or cameras as part of a vehicle vision system (such as utilizing a rearward facing camera and sidewardly facing cameras and a forwardly facing camera disposed at the vehicle) may provide a display of a top-down view or birds-eye view of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US11/62755, filed Dec. 1, 2011 and published Jun. 7, 2012 as International Publication No. WO 2012/075250, and/or U.S. patent application Ser. No. 13/333,337, filed Dec. 21, 2011 and published Jun. 28, 2012 as U.S. Publication No. US 2012-0162427, and/or U.S. provisional applications, Ser. No. 61/615,410, filed Mar. 26, 2012; Ser. No. 61/588,833, filed Jan. 20, 2012; Ser. No. 61/570,017, filed Dec. 13, 2011; Ser. No. 61/568,791, filed Dec. 9, 2011; Ser. No. 61/559,970, filed Nov. 15, 2011; Ser. No. 61/540,256, filed Sep. 28, 2011, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the above describes a particular embodiment(s) of the invention, it will be appreciated that modifications and variations may be made to the detailed embodiment(s) described herein without departing from the spirit of the invention.

The invention claimed is:

1. A method of estimating distance between a mobile unit and a vehicle, said method comprising:
    providing a time of flight subsystem including circuitry incorporated in the mobile unit and circuitry incorporated in the vehicle;
    generating, by the time of flight subsystem, a time of flight distance signal by periodically transmitting a time of flight signal between the mobile unit and the vehicle and measuring the time taken for transmission of the time of flight signal between the mobile unit and the vehicle;
    disposing a travel sensor at the mobile unit;
    generating a travel sensor signal using the travel sensor;
    initializing, by the mobile unit circuitry, a value of a distance estimate signal based on the time of flight distance signal;
    determining, by the mobile unit circuitry, movement of the mobile unit based on variance in the travel sensor signal; and
    changing, by the mobile unit circuitry, the initialized value of the initialized distance estimate signal based upon determination of movement of the mobile unit, wherein the value of the initialized distance estimate signal is increased by a first predetermined quantum responsive to the time of flight distance signal being greater than the initialized distance estimate signal, and wherein the value of the initialized distance estimate signal is decreased by a second predetermined quantum responsive to the time of flight distance signal being less than the initialized distance estimate signal.

2. The method of claim 1, including passing a raw time of flight distance signal generated by the time of flight subsystem through a smoothing filter to thereby generate a smoothed time of flight distance signal utilized by said changing step.

3. The method of claim 2, wherein the smoothing filter comprises a digital biased median filter that is biased low.

4. The method of claim 2, further comprising determining, based on the value of the smoothed time of flight distance signal at substantially the same instant in time when movement of the mobile unit is determined, whether the smoothed time of flight distance signal is greater than or less than the initialized distance estimate signal.

5. The method of claim 2, further comprising determining, based on an average of the smoothed time of flight distance signal as generated over a period of time, whether the smoothed time of flight distance signal is greater than or less than the initialized distance estimate signal.

6. The method of claim 1, including passing a raw travel sensor signal generated by the travel sensor through a smoothing filter.

7. The method of claim 6, wherein the smoothing filter comprises a digital median filter.

8. The method of claim 6, wherein determining movement of the mobile unit includes examining the smoothed travel sensor signal for the occurrence of two serial local peaks, each of which exceeds an amplitude and occurs within a range of time periods indicative of human gait.

9. The method of claim 8, wherein determining movement of the mobile unit further includes examining the smoothed travel sensor signal for a slope within a predetermined range of slopes indicative of human gait.

10. The method of claim 1, wherein the first predetermined quantum is different than the second predetermined quantum.

11. A method of estimating distance between a mobile unit and a vehicle, said method comprising:
    providing a time of flight subsystem including circuitry incorporated in the mobile unit and circuitry incorporated in the vehicle;
    generating, by the time of flight subsystem, a time of flight distance signal by periodically transmitting a time of flight signal between the mobile unit and the vehicle and measuring the time taken for transmission of the time of flight signal between the mobile unit and the vehicle;
    disposing a travel sensor at the mobile unit;
    generating a travel sensor signal using the travel sensor;
    initializing, by the mobile unit circuitry, a value of a distance estimate signal based on the time of flight distance signal;
    determining, by the mobile unit circuitry, movement of the mobile unit based on variance in the travel sensor signal;
    determining, by the mobile unit circuitry, based on an average of the time of flight distance signal as generated over a period of time, whether the time of flight distance signal is greater than or less than the initialized distance estimate signal;
    changing, by the mobile unit circuitry, the initialized value of the initialized distance estimate signal based upon determination of movement of the mobile unit, wherein the value of the initialized distance estimate signal is increased by a first predetermined quantum responsive to the time of flight distance signal being greater than the initialized distance estimate signal, and wherein the value of the initialized distance estimate signal is decreased by a second predetermined quantum responsive to the time of flight distance signal being less than the initialized distance estimate signal; and
    wherein determining movement of the mobile unit includes examining the travel sensor signal for the occurrence of two serial local peaks, each of which exceeds an amplitude and occurs within a range of time periods indicative of human gait.

12. The method of claim 11, including passing a raw time of flight distance signal generated by the time of flight subsystem through a smoothing filter to thereby generate a smoothed time of flight distance signal utilized by said changing step.

13. The method of claim 11, including passing a raw travel sensor signal generated by the travel sensor through a smoothing filter.

14. The method of claim 11, further comprising determining, based on the value of the time of flight distance signal at substantially the same instant in time when movement of the mobile unit is determined, whether the time of flight distance signal is greater than or less than the initialized distance estimate signal.

15. The method of claim 11, wherein determining movement of the mobile unit further includes examining the travel sensor signal for a slope within a predetermined range of slopes indicative of human gait.

16. The method of claim 11, wherein the first predetermined quantum is different than the second predetermined quantum.

17. A method of estimating distance between a mobile unit and a vehicle, said method comprising:
  providing a time of flight subsystem including circuitry incorporated in the mobile unit and circuitry incorporated in the vehicle;
  generating, by the time of flight subsystem, a time of flight distance signal by periodically transmitting a time of flight signal between the mobile unit and the vehicle and measuring the time taken for transmission of the time of flight signal between the mobile unit and the vehicle;
  disposing a travel sensor at the mobile unit;
  generating a travel sensor signal using the travel sensor;
  initializing, by the mobile unit circuitry, a value of a distance estimate signal based on the time of flight distance signal;
  determining, by the mobile unit circuitry, movement of the mobile unit based on variance in the travel sensor signal;
  changing, by the mobile unit circuitry, the initialized value of the initialized distance estimate signal based upon determination of movement of the mobile unit, wherein the value of the initialized distance estimate signal is increased by a first predetermined quantum responsive to the time of flight distance signal being greater than the initialized distance estimate signal, and wherein the value of the initialized distance estimate signal is decreased by a second predetermined quantum responsive to the time of flight distance signal being less than the initialized distance estimate signal;
  passing a raw time of flight distance signal generated by the time of flight subsystem through a smoothing filter to thereby generate a smoothed time of flight distance signal utilized by said changing step; and
  passing a raw travel sensor signal generated by the travel sensor through another smoothing filter.

18. The method of claim 17, further comprising determining, based on at least one of (i) the value of the smoothed time of flight distance signal at substantially the same instant in time when movement of the mobile unit is determined, and (ii) an average of the smoothed time of flight distance signal as generated over a period of time, whether the smoothed time of flight distance signal is greater than or less than the initialized distance estimate signal.

19. The method of claim 17, wherein determining movement of the mobile unit includes at least one of (i) examining the smoothed travel sensor signal for the occurrence of two serial local peaks, each of which exceeds an amplitude and occurs within a range of time periods indicative of human gait, and (ii) examining the smoothed travel sensor signal for a slope within a predetermined range of slopes indicative of human gait.

20. The method of claim 17, wherein the first predetermined quantum is different than the second predetermined quantum.

\* \* \* \* \*